Sept. 1, 1970  R. G. LOVE ET AL  3,526,133
MAGNETIC COUPLING
Filed June 15, 1967  3 Sheets-Sheet 1
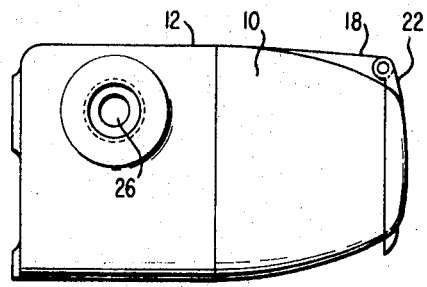
FIG.1
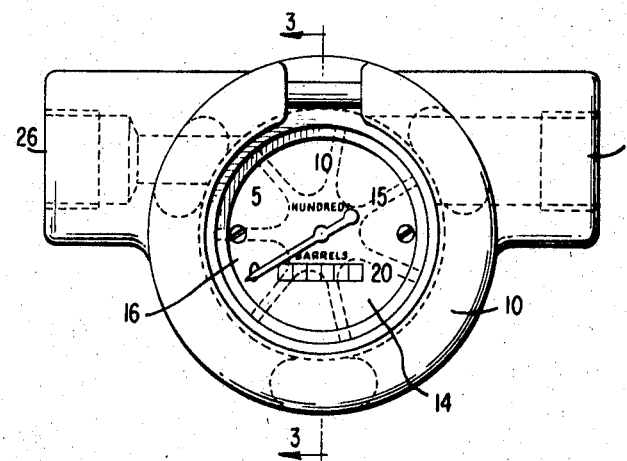
FIG.2
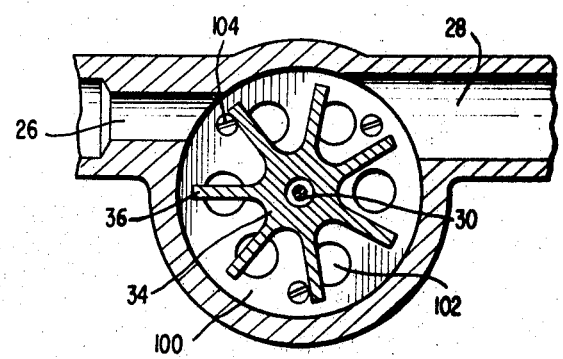
FIG.5
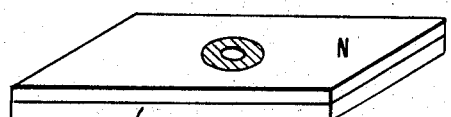
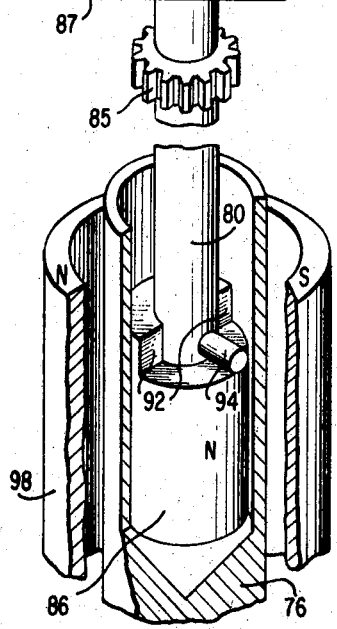
FIG.4
INVENTORS
ROBERT G. LOVE
PAUL A. MOORE
BY Burns, Doane, Benedict, Swecker & Mathis
ATTORNEYS

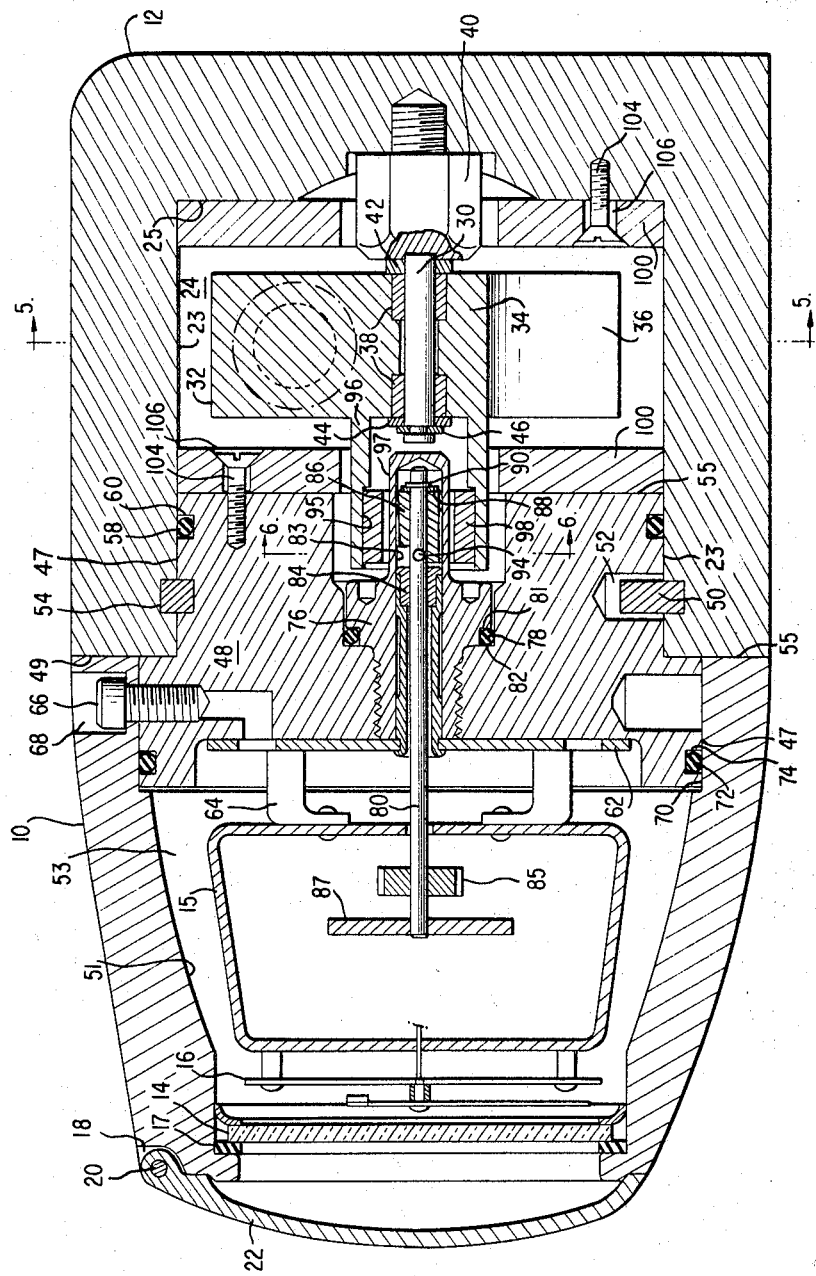

Sept. 1, 1970 R. G. LOVE ET AL 3,526,133
MAGNETIC COUPLING
Filed June 15, 1967 3 Sheets-Sheet 3

United States Patent Office 3,526,133
Patented Sept. 1, 1970

3,526,133
MAGNETIC COUPLING
Robert G. Love and Paul A. Moore, Duncan, Okla., assignors to Halliburton Company, Duncan, Okla., a corporation of Delaware
Filed June 15, 1967, Ser. No. 646,272
Int. Cl. G01f 1/06
U.S. Cl. 73—229
29 Claims

ABSTRACT OF THE DISCLOSURE

A combination magnetic and mechanical coupling between a driving shaft and a relatively high inertia driven shaft. The driven shaft has a relatively low inertia magnetic element mounted thereon for limited rotation thereabout. This element assists in the reestablishment of the magnetic coupling, when it is lost, by imparting a mechanical impulse of acceleration to the driven shaft at least once during said full rotation of the driving shaft relative to the driven shaft.

BACKGROUND OF THE INVENTION

There are numerous applications wherein it is desired to drive a meter registering mechanism by a fluid flow responsive impeller while maintaining the fluid tight integrity of the system. This is particularly important in the handling of certain hazardous fluids and under circumstances wherein the contamination of the fluid must be avoided and/or corrosion or interference with the register mechanism of the meter would result from exposure to the fluid.

It is a common expedient in the fluid meter art to utilize a rigid imperforate nonmagnetic seal to separate a fluid chamber wherein a fluid flow responsive impeller is mounted from a meter registering mechanism and to magnetically couple the meter registering mechanism to the impeller through the nonmagnetic seal. In such an instrument the seal may conveniently take the shape of a cup or a cylinder having a closed end which depends into the fluid chamber. The impeller is rotatably mounted in the fluid chamber coaxially with the cup. A magnetic member attached to the impeller, for rotation therewith in response to fluid flow, is conventionally disposed concentrically to the cup in an overlying relation for rotation thereabout in juxtaposition to its exterior surface.

The meter registering mechanism driving shaft is rotatably mounted within the cup coaxially therewith and carries a magnetic member in juxtaposition to the interior surface of the cup. The coupling of the impeller and the meter registering mechanism is established by the lines of magnetic force between the respective magnetic members through the nonmagnetic cup. Rotation of the impeller in response to fluid flow will thus drive the meter registering mechanism through the nonmagnetic cup and thereby preserve the fluid-tight integrity of the system.

While fluid tight integrity can be preserved by the use of an imperforate nonmagnetic cup, problems have arisen in maintaining the magnetic coupling between the magnetic members carried by the driving and driven elements. Meters of this type characteristically have a magnetic driving torque which is quite low relative to the moment of inertia of the driven element, e.g., a magnet suitable for driving a hysteresis tachometer or drag cup.

Large magnets have been employed in attempting to provide a magnetic field of sufficient strength to retain the magnetic coupling between the driving and driven element when the driving element, the impeller, is subjected to rapid acceleration in response to a change in the rate of fluid flow. The use of large magnets has in turn either increased the inertia of the driven element, if there mounted, or, if mounted on the driving shaft, has increased the inertia of the driving element. Increasing the inertia of the driven shaft increases the magnetic force necessary to maintain magnetic coupling. Increasing the inertia of the driving shaft decreases its responsiveness to changes in fluid flow. The disadvantages in having the impeller continue to rotate after fluid flow ceases or in having fluid flow increase without the increase being immediately reflected in the rotational speed of the impeller and the meter are quite obvious.

It may be extremely difficult if not impossible to reestablish magnetic coupling between the driven and driving elements once the coupling has been broken. Assume, for purposes of illustration, two-pole driving and driven magnetic elements. Acceleration of the driving element, in response to a change in fluid flow greater than the acceleration which the driven element is capable of following due to its inertia, will disrupt the coupling between the elements. Once the coupling between unlike poles has been broken, the forces of repulsion between like poles will tend to accelerate the driven element as the driving element overruns the driven element and the like poles approach registration. As like poles of the driving member overtake those of the driven member and pass the point of exact registration, the force of repulsion between like poles will tend to decelerate the driven element and thus tend to cancel out any increase in the speed of the driven member.

As the driving member continues to overtake the driven member unlike poles will again approach registration and the forces of magnetic attraction therebetween will tend to accelerate the driven member. The force of attraction between the unlike poles will likely again be insufficient to maintain magnetic coupling due to the inertia of the driven element if at that time there is any appreciable difference in speed between the members.

Another cycle of alternative attraction and repulsion between like poles will be instituted with it being likely that magnetic coupling will once again be broken and the cycle repeated. The disruption of magnetic coupling may of course result from acceleration in a positive or negative direction and the term acceleration as herein used is intended to include both acceleration and deceleration.

The disruption of magnetic coupling is not apparent from the face of the meter and absent some means of bringing the driven shaft up to the speed of the driving shaft so that the force of attraction between unlike poles is sufficient to overcome the inertia differential of the driven member, the meter will continue to give a false indication of fluid flow. The disadvantages of erroneous metering are too obvious to warrant discussion.

Accordingly, it is an object of the present invention to provide a method and apparatus whereby magnetic coupling between driving and driven members may be quickly reestablished after being disrupted.

Another object of this invention is to provide a method and apparatus whereby the magnetic coupling between unlike poles of a low inertia driving member and a high inertia driven member may be rapidly reestablished after it has been disrupted due to sudden acceleration of the driving member.

A further object is a method and apparatus for accelerating a driven mganetic member to a speed approximating that of a driving magnetic member whereby magnetic coupling can be reestablished therebetween.

A still further object is to provide a method and apparatus for driving the magnetic rotor of a hysteresis tachometer by magnetic coupling.

THE DRAWINGS

The invention may more readily be understood by reference to the drawings of which:

FIG. 1 is a side view of a flowmeter incorporating the present invention;

FIG. 2 is a front view of the flowmeter of FIG. 1;

FIG. 3 is a section taken through lines 3—3 of FIG. 1;

FIG. 4 is a cut-away perspective view of one embodiment of the magnetic coupling elements showing the construction thereof;

FIG. 5 is a section taken through lines 5—5 of FIG. 3.

THE PREFERRED EMBODIMENT

Figure 9:
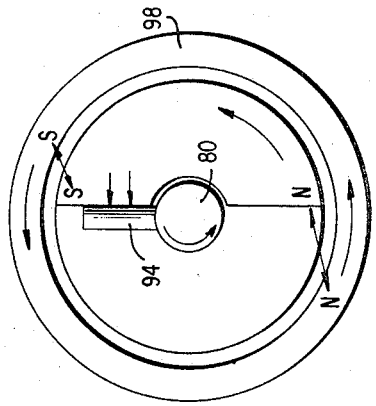
FIGS. 6–12 are successive sections taken through lines 6—6 of FIG. 3 showing the position of the driven magnetic member as the driving magnetic member rotates with respect to the driven shaft.
Figure 12:
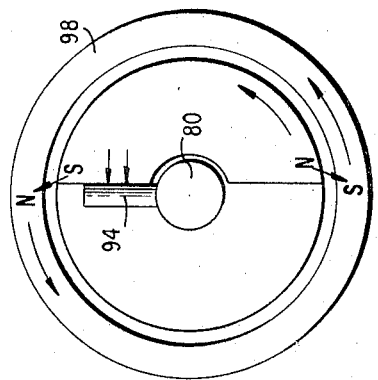
Figure 8:
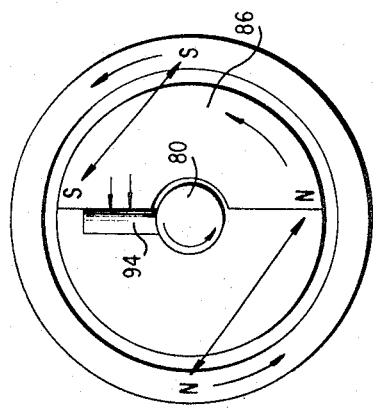

The novel magnetic coupling of the present invention will be hereinafter explained by way of example in the invironment of a fluid flowmeter.

Turning now to the figures, the flowmeter housing is divided into a cup-shaped rear section 12 and a cylindrical front section 10 separable therefrom. The front section 10 houses a meter 15 of a conventional type which may indicate the rate of fluid flow and/or total fluid flow. A circular glass 14 is hermetically sealed by means of a lens gasket 17 into the extreme forward end of the housing section 10 through which the face 16 of the meter 15 may be seen.

Housing section 10 has a projection 18 centered over the extreme forward end thereof. Hinged to projection 18 by means of pin 20 is a rigid arcuate cover plate 22 which normally overlies the extreme forward end of housing section 10 and which is supported thereby out of contact with glass 14 so as to protect the glass 14 and the meter 15 from inadvertent damage. Hinged as it is above glass 14, cover plate 22 may be easily lifted by hand when it is desired to read the meter 15.

The rear section 12 of the housing defines internally the cylindrical sides 23 and rear end wall 25 of a fluid chamber 24. Rotatably mounted within fluid chamber 24 on a fixed stub shaft 30 which projects forwardly from the rear end wall 25 is a fluid impeller 32. Impeller 32 may be of the paddle wheel type and may consist of a hub portion 34 and a plurality of flat blades 36 of equal size extending radially outward therefrom along the axis of stub shaft 30.

The stub shaft 30 is threaded into the internal rear end wall 25 of the fluid chamber 24. The impeller 32 is rotatably supported thereon by sleeve bearings 38. Movement of the impeller 32 in an axial direction along stub shaft 30 is prevented at the rearward end by spacer 40 and washer 42. Washer 44 and resilient snap-type retaining ring 46 secure the impeller 32 from forward axial movement along stub shaft 30. Spacer 40 may be integral with stub shaft 30 and hexagon in cross section so as to facilitate the threading of the stub shaft 30 into the rear end wall 25 of the fluid chamber 24.

As may be seen from the dotted lines in FIG. 2 the rotor chamber is in fluid communication with a fluid inlet 26 and a fluid outlet 28 to which a fluid source and a delivery nozzle (not shown) may be attached. Inlet 26 and outlet 28 are coaxially aligned and are positioned with respect to the fluid chamber 24 and impeller 32 so that their axis passes tangentially through the mean circumference of the impeller 32 in a direction normal the axis of stub shaft 30. By so positioning the inlet 26 and outlet 28 the fluid stream is directed successively toward the center of each blade 36 as the impeller 32 rotates about stub shaft 30.

The fluid inlet 26 is of smaller diameter than fluid outlet 28 and is machined to a predetermined size so as to provide a fixed relationship between fluid flow therethrough and the rotational velocity which will be imparted to impeller 32.

Separating the housing internally into front and rear compartments is a transverse divider 48. Divider 48 is secured to the rear housing section 12 by means of a spring retaining wire 50 which is compressed during assembly into a recess 52 in the annular wall 47 of divider 48 and which expands on registration with recesses 54 in the internal sidewalls 23 of housing section 12.

Mounted within the front compartment 53 on supports 64 extending forwardly from the forward surface 62 of transverse divider 48 is a conventional meter 15.

The rearmost surface 55 of the divider 48 defines the forward wall of fluid chamber 24. Fluid tight integrity between the internal sidewalls 23 of housing section 12 and the annular wall 47 of divider 48 is obtained by means of annular seal 58 which is compressed into an annular groove 60 in the wall 47 of divider 48.

The rearward end 55 of cylindrical housing forward section 10 when placed in abutting relationship with the open end 49 of cup-shaped housing section 12 overlies a portion of the transverse divider 48. Forward housing portion 10 is secured to divider 48 by means of a bolt 66 inserted radially inward in countersunk hole 68.

Fluid-tight integrity between the internal cylindrical surfaces 51 of forward housing 10 and the annular wall 47 of the divider 48 is obtained by means of annular seal 72 which is compressed into an annular groove 74 in the wall 47 of divider 48.

Transverse divider 48 is centrally apertured so as to receive from the fluid chamber 24 side thereof a threaded plug 76 which extends into the fluid chamber 24. Fluid-tight integrity between plug 76 and divider 48 is obtained by means of annular seal 78 which is compressed between the abutting shoulder 81 of plug 76 and shoulder 82 of divider 48 by the threading of plug 76 into divider 48.

Plug 76 is made of non-magnetic material and is centrally bored from the meter 15 side of divider 48 to a point adjacent the rearward end thereof. Plug 76 thus forms a cylinder with the rearward end closed and separates fluid chamber 24 from meter compartment 53.

A meter registering drive shaft 80 is rotatably mounted within bore 83. In a conventional fashion shaft 80 may carry a gear 85 which is designed to drive a conventional meter dial of a cumulative flow indicating device. Shaft 80 may also carry a bar magnet 87 designed to provide a conventional magnetic drive for a conventional flow rate indicator. With the cumulative flow indicator and the flow rate indicator being conventional in character, their structure has not been described so as to avoid obscuring the salient features of the present invention.

Cylindrical magnet 86 is rotatably mounted within bore 83 on shaft 80 adjacent the rearmost end thereof. Magnet 86 is bipolar and is polarized so that its north and south end magnetic poles run the length of the magnet parallel to the axis thereof. Axial displacement of magnet 86 relative to shaft 80 is prevented by sleeve bearing 84 at the forward end of magnet 86 and at the rearward end by the combination of washer 88 and snap-type retaining ring 90. The length of cylindrical magnet 86 is reduced axially at its forward end over one-half the cross-section thereof so as to form axially extending shoulders 92. A pin 94 is carried by shaft 80 and extends radially outward therefrom. Magnet 86 is axially placed on shaft 80 with respect to the pin 94 so that the pin 94 lies between the two discrete lengths of the magnet 86. The rotation of magnet 86 about shaft 80 is thus limited to approximately 180° by the abutment of shoulders 92 against pin 94.

Impeller 32 has a cylindrical projection 96 which extends forwardly from hub 34 in juxtaposition to the external cylindrical surface 97 of plug 76 in a concentric overlying relationship thereto. Carried by the interior cylindrical surface 95 of projection 96 is a cylindrical two pole magnet 98 polarized in a manner similar to the polarization of magnet 86. Magnet 86 and magnet 98 are thus axially aligned and concentrically disposed internally and externally respectively of nonmagnetic plug 76. The magnetic lines of force emanating from magnet 98 and magnet 86 pass freely through nonmagnetic plug 76 causing magnet 86 to rotate about shaft 80 within the limits allowed by the abutment of pin 94 with shoulder 92 so as to place unlike poles of the respective magnets in registration.

Secured within fluid chamber 24 to the rear wall 55 of transverse divider 48 and to the internal rear wall 25 of housing section 12 are stators 100 centrally apertured respectively to accommodate the forwardly extending projection 96 of impeller 32 and spacer 40 of stub shaft 30. Stators 100 are identical and interchangeable and have a plurality of apertures 102 therein spaced around a mean bolt circle. The stators 100 are secured to wall 25 and to wall 55 of divider 48 by screws 104 threaded into countersunk holes 106. The holes 102 in stator 100 create a pattern of fluid flow designed to establish a more linear speed flow relationship.

In explaining the operation of the novel magnetic coupling of the subject invention, reference is made to FIGS. 6–12 in which the position of the driven magnet 86 is shown as driving magnet 98 rotates relative to shaft 80. Assuming a give rate of fluid flow causing impeller 32 to rotate in response thereto, the meter register shaft 80 is driven in sync with impeller 32 by means of the magnetic coupling between concentrically disposed magnetic members 86 and 98. Assume further that a sudden increase int he rate of fluid flow rapidly accelerates impeller 32 and driving magnet 98 to a much higher rotational speed.

Figure 7:
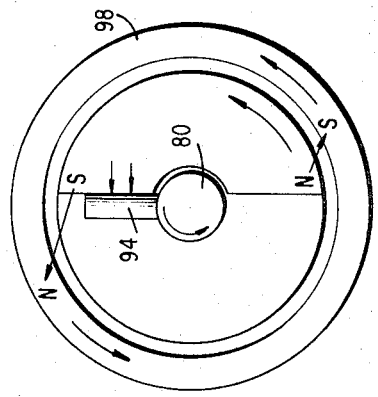
Figure 10:
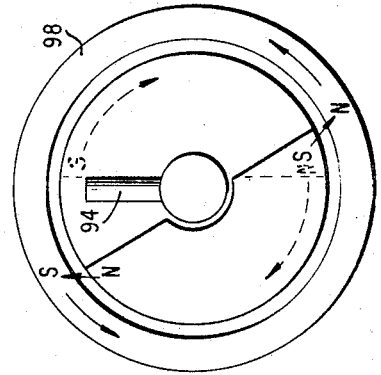
Figure 6:
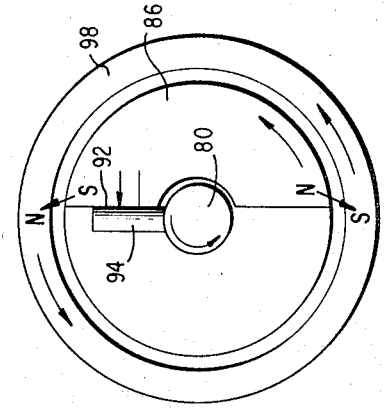

Magnet 86 mounted on shaft 80 will attempt to maintain the coupling shown in FIG. 6 and to rotate with the magnet 98 but in order to do so must drive shaft 80 because of the abutment of shoulder 92 with pin 94. Where the inertia of shaft 80 is such that it cannot be overcome by the available magnetic force between magnets 86 and 98, the magnetic coupling between unlike poles of magnets 86 and 98 will be broken. As driving magnet 98 rotates relative to driven magnet 86 as indicated in FIG. 7, the rotational torque gradually increases to a maximum as the lines of attraction between unlike poles and repulsion between like poles becomes substantially tangential to shaft 80. As the magnetic coupling between magnets 86 and 98 is broken and magnet 98 continues to rotate relative to magnet 86 through the position shown in FIG. 8, the total torque decreases despite the approach of like poles but the forces of magnetic repulsion therebetween will still tend to accelerate shaft 80 as the driven magnet 86 exerts pressure on pin 94 through shoulder 92.

Figure 11:
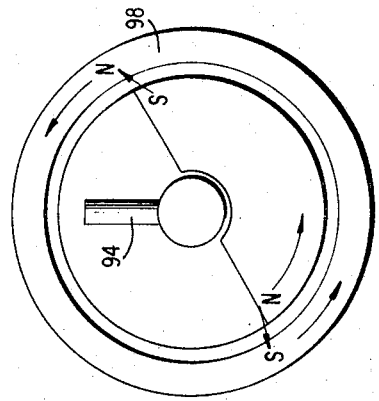

As indicated in FIG. 9, driving magnet 98 will continue to rotate relative to the driven magnet 86 despite the breaking effect of the repulsion forces between like poles. As like poles pass the point of exact registration the forces of magnetic repulsion therebetween will cause immediate backward rotation of driven magnet 86 relative to shaft 80 from the dotted line position to the solid line position shown in FIG. 10. Driven magnet 86 is free to rotate in the reverse direction for approximately 180°. During this backward rotation, magnet 86, having very little inertia independent of the shaft 80, will immediately establish magnetic coupling with driving magnet 98, as indicated in FIG. 11. Magnet 86 will then again reverse its direction of rotation and rotate in synchronism with driving magnet 98 relative to shaft 80 until shoulder 92 again abuts pin 94 in the position shown in FIG. 12. The impact of shoulder 92 of magnet 86 with pin 94 will reduce the speed of magnet 86 to that of the shaft 80 but will impart an impulse of acceleration to shaft 80. As earlier explained, the driving magnet 98 will continue to rotate relative to the driven magnet 86 increasing the rotational torque until magnetic coupling is again disrupted at the position indicated in FIG. 6, and the cycle is repeated.

The force with which the shoulder 92 of magnet 86 impacts on pin 94 is of course a function of the speed differential between impeller 32 and meter registering assembly shaft 80. This cyclical impulse acceleration of shaft 80 proportional to the speed differential will almost immediately bring shaft 80 up to the speed of impeller 32 so that the magnetic coupling between unlike poles of magnet 86 and magnet 98 can be maintained.

The operation of the coupling just outlined with respect to acceleration is also effective for a decrease in fluid flow to which the impeller 32 is immediately responsive. Absent the coupling of the present invention, shaft 80 would continue to rotate at its former speed due to its inertia. Once each cycle of relative rotation between magnets 86 and 98 the meter shaft 80 will receive through pin 94 an impulse of deceleration as magnet 86 is freely rotated relatively forward and then backward into driving impact with shoulder 92.

It is thus possible to use a light weight, immediately responsive impeller to drive a shaft having considerable inertia, for example, a hysteresis tachometer, by means of the magnet coupling between very light weight magnets.

Figure 13:
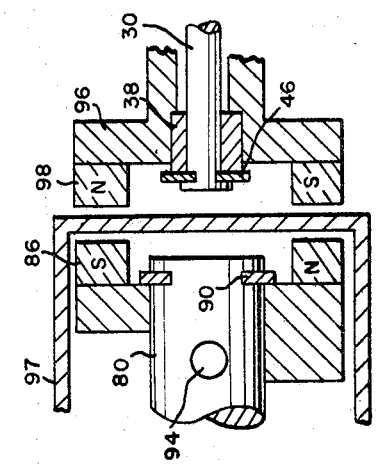
FIG. 13 is a section illustrating an alternative embodiment of the magnetic coupling of the present invention.

Although the magnetic coupling has been described with respect to a concentric arrangement of magnetic elements, it is to be understood that the invention is equally applicable to an arrangement wherein the poles of the respective magnetic elements are of the same radial distance from the shaft axis. Such an arrangement is illustrated in FIG. 13 wherein like elements have been accorded like numerical designations to facilitate an understanding thereof.

While particularly adapted to drive a meter register assembly, the novel magnetic coupling described has innumerable applications across a wide spectrum of environments. Whereas the present specification has described in detail only one embodiment of the invention, this description has been for purposes of illustration only and it is to be understood that many modifications will suggest themselves to one skilled in the art and may be made without departing from the scope of the invention as defined by the appended claims and the broad range of equivalents to be accorded thereto.

What is claimed is:
1. A method of magnetically coupling a driven shaft of relatively high mass and a driving shaft of relatively low mass comprising the steps of:
 (a) establishing magnetic coupling between the driving shaft and a magnetic element of relatively low mass carried by the driven shaft;
 (b) accelerating the rotational speed of the driving shaft, thereby accelerating the magnetic element of relatively low mass;
 (c) equalizing the rotational speed of the magnetic element and driven shaft, thereby imparting an increment of rotational acceleration to the driven shaft and disrupting the magnetic coupling between the driven shaft and magnetic element;
 (d) reestablishing magnetic coupling between the driving shaft and the magnetic element;
 (e) equalizing the rotational speed of the magnetic element and the driven shaft, thereby imparting an in- crement of rotational acceleration to the driven shaft and disrupting the magnetic coupling between the driving shaft and magnetic element; and (f) reestablishing magnetic coupling between the driving shaft and the magnetic element, thereby coupling the driving and driven shafts.

2. The method of claim 1 wherein said element is carried by said driven shaft.

3. The method of claim 2 wherein said element is a cylindrical permanent magnet.

4. The method of claim 3 wherein said driving shaft carries a cylindrical permanent magnet in juxtaposition to said element.

5. A magnetic coupling comprising:
a driving shaft;
a driven shaft of relatively high mass;
a magnetic element of relatively low mass carried by said driven shaft and magnetically coupled to said driving shaft;
means for accelerating the rotational speed of said driving shaft beyond the acceleration capability of said driven shaft but within the acceleration capability of said magnetic element; and
means for equalizing the rotational speeds of said magnetic element and said driven shaft to impart thereby an increment of rotational acceleration to said driven shaft and to disrupt the magnetic coupling between said driven shaft and said magnetic element for less than one relative revolution between said element and said driven shaft.

6. The magnetic coupling of claim 5 wherein said element is a cylindrical permanent magnet and wherein said equalizing means includes means for limiting the relative rotation between said driven shaft and said element.

7. The magnetic coupling of claim 6 including a cylindrical permanent magnet carried by said driving shaft in juxtaposition to said element.

8. A magnetic coupling comprising:
a cup-shaped non-magnetic housing;
a first shaft mounted for rotation within said housing along the axis thereof;
a first magnetic member mounted on said first shaft for rotation thereabout in juxtaposition to the internal surface of said housing;
means for limiting the rotation of said first magnetic member about said first shaft to less than a complete revolution;
a second shaft mounted for rotation externally of said housing, said second shaft being coaxial with said first shaft; and
a second magnetic member carried by said second shaft in juxtaposition to the external surface of said housing whereby rotation of said second shaft imparts rotation to said first shaft.

9. A magnetic coupling as set out in claim 8 wherein the mass of said first member is small relative to the mass of said second shaft.

10. A magnetic coupling as set out in claim 8 wherein said first magnetic member includes a cylinder having a transverse slot extending radially outwardly from the inner surface thereof and wherein said means for limiting the rotation of said first magnetic member includes a pin carried by said first shaft within said slot.

11. A magnetic coupling as set out in claim 10 wherein said transverse slot is located at one end of said first magnetic member and extends throughout an arc of substantially 180 degrees thereby reducing the length of said first magnetic member by the width of said slot over substantially one-half the cross section of said cylinder.

12. A magnetic coupling as set out in claim 10 wherein said first magnetic member includes a cylinder permanently magnetized so as to produce continuous poles extending axially along the length thereof.

13. A magetic coupling as set out in claim 12 wherein said second magnetic member includes a cylinder permanently magnetized so as to produce continuous poles extending axially along the length thereof, said second magnetic member having the same number of poles as said first magnetic member.

14. A magnetic coupling as set out in claim 13 wherein said first and second magnetic members each have two poles, and wherein the rotation of said first magnetic member about said first shaft is limited to an arc of less than 180 degrees.

15. A magnetic coupling comprising:
a first shaft;
a first magnetic member rotatably mounted on said first shaft;
means for limiting the rotation of said first magnetic member to less than one complete revolution;
a second shaft coaxial with said first shaft; and
a second magnetic member carried by said second shaft in juxtaposition to said first magnetic member.

16. A magnetic coupling as set out in claim 15 wherein said first and second magnetic members are permanent magnets.

17. A magnetic coupling as set out in claim 16 wherein the mass of said first member is small relative to the mass of said second shaft.

18. A magnetic coupling as set out in claim 15 wherein said first magnetic member includes a cylinder having a transverse slot extending radially outward from the inner surface thereof, and
wherein said means for limiting the rotation of said first magnetic member includes a pin carried by said first shaft.

19. A magnetic coupling as set out in claim 18 wherein said transverse slot is located at one end of said first magnetic member and extends throughout an arc of substantially 180 degrees thereby reducing the length of said first magnetic member by the width of said slot over substantially one-half the cross section of said cylinder.

20. A magnetic coupling as set out in claim 18 wherein said first magnetic member is permanently magnetized so as to have alternating magnetic poles spaced around the ends thereof and wherein said second magnetic member includes a like number of alternating magnetic poles disposed at the same radial distance from the axis of said first and second shafts as the poles of said first magnetic member.

21. A fluid meter comprising:
a housing formed internally with a rotor chamber having inlet and outlet openings;
a fluid tight register assembly mounted within said housing with its register portion disposed outside said chamber and having a part projecting into said chamber;
a shaft rotatably mounted within said part for driving said register;
a first magnetic member mounted for rotation on said shaft;
means for limiting the rotation of said first member about said shaft to less than one complete revolution; and
an impeller rotatably supported within said chamber coaxially with said shaft;
said impeller having a magnetic portion overlying said part for rotation thereabout in magnetic driving relation to said magnetic member.

22. A fluid meter as set out in claim 21 wherein the mass of said shaft is large relative to said first magnetic member.

23. A fluid meter as set out in claim 21 wherein said magnetic member is a cylindrical permanent magnet having a plurality of salient poles extending axially along the length of said member and wherein the magnetic portion of said impeller overlying said part comprises a cylindrical permanent magnet having a like number of salient poles, said poles extending axially along the length of said magnetic portion.

24. A fluid meter as set out in claim 21 wherein said magnetic member includes a cylinder having a transverse slot extending radially outward from the inner surface of said cylinder and wherein said means for limiting the rotation of said magnetic member includes a pin carried by said shaft within said slot.

25. A fluid meter as set out in claim 23 wherein said magnetic member includes a cylinder having a transverse slot extending radially outward from the inner surface of said cylinder and wherein said means for limiting the rotation of said magnetic member includes a pin carried by said shaft within said slot.

26. A fluid meter as set out in claim 21 wherein said first magnetic member and said magnetic portion each have two poles and wherein said slot extends through an arc of substantially 180 degrees.

27. A fluid meter as set out in claim 23 wherein said impeller is supported within said chamber on a stub shaft carried by said housing and wherein said inlet and outlet openings are substantially aligned.

28. A fluid meter as set out in claim 27 wherein said impeller is a plural vane paddle wheel and wherein said stub shaft is perpendicular to the axis of fluid flow.

29. A fluid meter as set out in claim 28 including a pair of apertured plates spaced along the axis of said impeller and carried respectively by said housing and said register assembly on opposite sides of said impeller.

References Cited

UNITED STATES PATENTS

| | | | |
|---|---|---|---|
| 2,414,688 | 1/1947 | Chambers | 310—103 |
| 2,481,360 | 9/1949 | Sprenger | 310—103 XR |
| 3,388,595 | 6/1968 | Last et al. | 73—231 |

RICHARD C. QUEISSER, Primary Examiner

J. K. Lunsford, Assistant Examiner

U.S. Cl. X.R.

310—103